United States Patent
Kauhaniemi et al.

(10) Patent No.: US 9,710,021 B2
(45) Date of Patent: Jul. 18, 2017

(54) APPARATUS AND METHOD OF PROVIDING AN APPARATUS COMPRISING A BENDABLE PORTION

(71) Applicant: Nokia Technologies Oy, Espoo (FI)

(72) Inventors: Ilpo Kauhaniemi, Vantaa (FI); Heikki Hakamaki, Helsinki (FI); Mikael Kontkanen, Ilmarinen (FI); Kalevi Salo, Salo (FI); Vesa Nevalainen, Turku (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/915,779

(22) PCT Filed: Aug. 7, 2014

(86) PCT No.: PCT/FI2014/050611
§ 371 (c)(1),
(2) Date: Mar. 1, 2016

(87) PCT Pub. No.: WO2015/028704
PCT Pub. Date: Mar. 5, 2015

(65) Prior Publication Data
US 2016/0195901 A1    Jul. 7, 2016

(30) Foreign Application Priority Data
Sep. 2, 2013  (GB) .................................. 1315588.2

(51) Int. Cl.
*G06F 1/16* (2006.01)

(52) U.S. Cl.
CPC .......... *G06F 1/1652* (2013.01); *G06F 1/1681* (2013.01)

(58) Field of Classification Search
None
See application file for complete search history.

(56) References Cited

U.S. PATENT DOCUMENTS

| 1,619,502 A | 3/1927 | Fox | |
|---|---|---|---|
| 7,532,916 B2* | 5/2009 | Lee | H04M 1/0216 379/433.13 |
| 2007/0117600 A1* | 5/2007 | Robertson, Jr. | H04M 1/0216 455/575.3 |
| 2008/0018631 A1 | 1/2008 | Hioki et al. | 345/206 |
| 2008/0042940 A1 | 2/2008 | Hasegawa | 345/76 |
| 2010/0232100 A1* | 9/2010 | Fukuma | F16G 13/18 361/679.01 |

(Continued)

FOREIGN PATENT DOCUMENTS

| KR | 10-2013-0073331 A | 7/2013 |
|---|---|---|
| WO | WO 2009/067010 A2 | 5/2009 |

(Continued)

*Primary Examiner* — Anthony Q Edwards
(74) *Attorney, Agent, or Firm* — Harrington & Smith

(57) ABSTRACT

An apparatus and method wherein the apparatus includes a bendable display; a substrate configured to support the bendable display wherein the substrate includes at least one bendable portion configured to enable the bendable display to be moved between an open configuration and a closed configuration; and a support structure provided adjacent to the bendable portion of the substrate configured to provide a rigid support for the bendable portion of the substrate, at least, when the display is in the closed configuration.

20 Claims, 16 Drawing Sheets

(56) References Cited

U.S. PATENT DOCUMENTS

Figure 1:
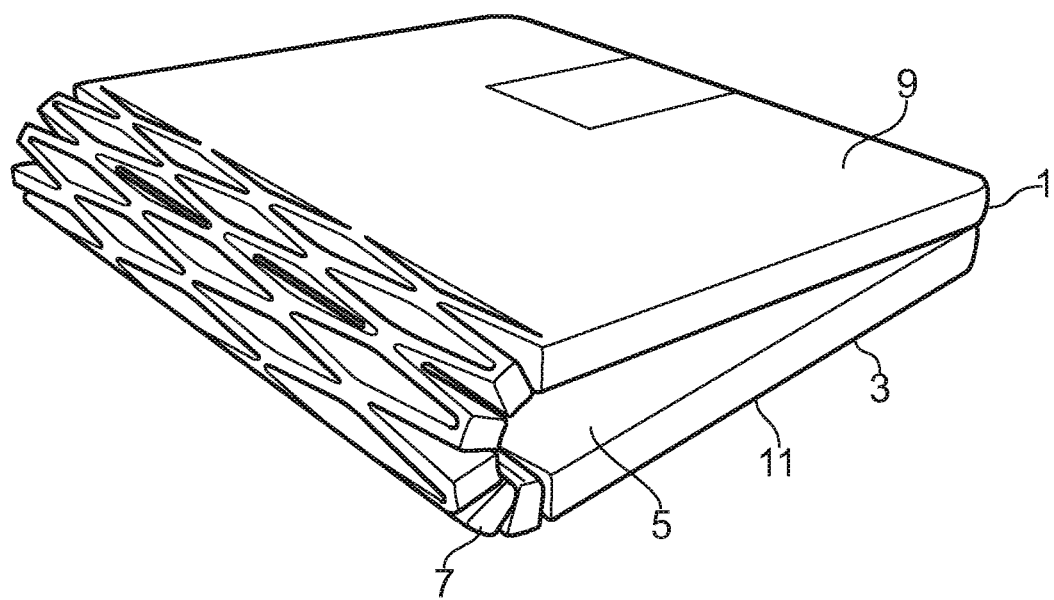

| | | | |
|---|---|---|---|
| 2011/0186899 A1 | 8/2011 | Van Lieshout | 257/99 |
| 2012/0002357 A1 | 1/2012 | Auld et al. | 361/679.01 |
| 2012/0307423 A1* | 12/2012 | Bohn | G06F 1/1641 |
| | | | 361/679.01 |
| 2012/0307472 A1 | 12/2012 | Bohn et al. | 361/807 |
| 2013/0216740 A1* | 8/2013 | Russell-Clarke | B23K 26/38 |
| | | | 428/33 |
| 2013/0222998 A1 | 8/2013 | Cho et al. | 361/679.27 |
| 2014/0126133 A1* | 5/2014 | Griffin | G06F 1/1652 |
| | | | 361/679.27 |
| 2015/0077917 A1* | 3/2015 | Song | G06F 1/1681 |
| | | | 361/679.27 |
| 2016/0085265 A1* | 3/2016 | Park | G06F 1/1652 |
| | | | 361/807 |
| 2016/0155965 A1* | 6/2016 | Kusuura | G06F 1/1652 |
| | | | 361/749 |

FOREIGN PATENT DOCUMENTS

| | | |
|---|---|---|
| WO | WO 2011/103317 A1 | 8/2011 |
| WO | WO 2012/167204 A2 | 12/2012 |

\* cited by examiner

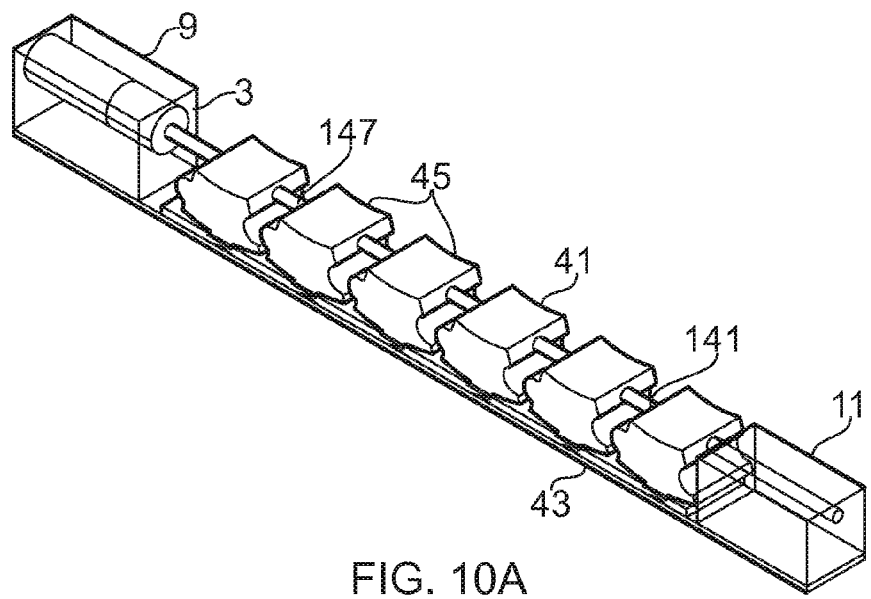
FIG. 10A
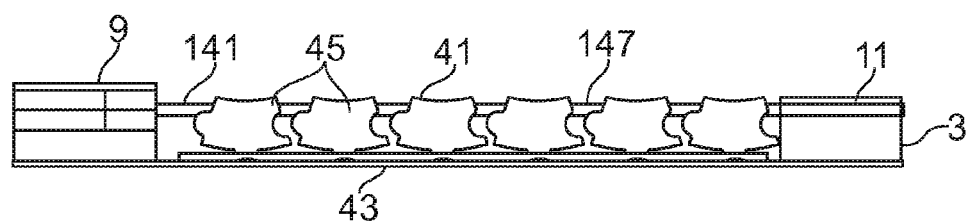
FIG. 10B
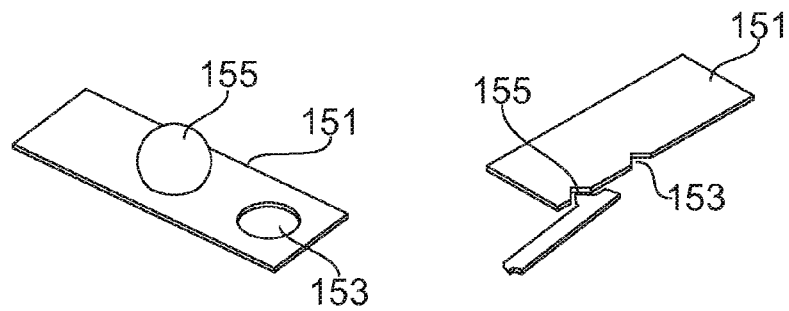
FIG. 11A
FIG. 11B

APPARATUS AND METHOD OF PROVIDING AN APPARATUS COMPRISING A BENDABLE PORTION

TECHNOLOGICAL FIELD

Examples of the present disclosure relate to an apparatus and method of providing an apparatus comprising a bendable portion. In particular, they relate to an apparatus and method of providing an apparatus comprising a bendable portion in which a display may be provided across the bendable portion.

BACKGROUND

Apparatus comprising bendable portions are known. Such apparatus may be electronic devices. In such apparatus it is beneficial to protect sensitive components such as displays or other electronic components from damage which may be caused by the bending of the apparatus.

BRIEF SUMMARY

According to various, but not necessarily all, examples of the disclosure there may be provided an apparatus comprising: a bendable display; a substrate configured to support the bendable display wherein the substrate comprises at least one bendable portion configured to enable the bendable display to be moved between an open configuration and a closed configuration; and a support structure provided adjacent to the bendable portion of the substrate configured to provide a rigid support for the bendable portion of the substrate, at least, when the display is in the closed configuration.

In some examples the support structure may be configured to prevent the radius of curvature of the bendable portion exceeding a threshold.

In some examples the support structure may comprise a plurality of rigid projections provided on a flexible member and arranged such that the rigid projections interlock with each other to form a rigid support when the display is in the closed configuration. The flexible member may be coupled to the substrate. The flexible member may be coupled to the substrate on either side of the bendable portion. The flexible member may be coupled to the substrate to allow for relative movement between the flexible member and the substrate.

In some examples the support structure may comprise a rigid member wherein the rigid member may be pivotably connected to the substrate on either side of the bendable portion. The rigid member may be configured to be moved between a horizontal position when the apparatus is in an open configuration and a vertical position when the apparatus is in a closed configuration. The rigid member may comprise two members configured to pivot relative to each other.

In some examples the support structure may also provide support to the substrate when the display is not in the closed configuration.

In some examples the bendable portion of the substrate may comprise a mesh structure.

In some examples the display may be continuous across the bendable portion.

In some examples when the display is in the closed position a first portion of the display and a second portion of the display may be configured facing each other.

In some examples there may be provided an electronics communication device comprising an apparatus as described above.

According to various, but not necessarily all, examples of the disclosure there may be provided a method comprising: providing a bendable display; providing a substrate configured to support the bendable display wherein the substrate comprises at least one bendable portion configured to enable the bendable display to be moved between an open configuration and a closed configuration; and providing a support structure adjacent to the bendable portion of the substrate configured to provide a rigid support for the bendable portion of the substrate at least when the display is in the closed configuration.

In some examples the support structure may be configured to prevent the radius of curvature of the bendable portion exceeding a threshold.

In some examples the support structure may comprise a plurality of rigid projections provided on a flexible member and arranged such that the rigid projections interlock with each other to form a rigid support when the display is in the closed configuration.

In some examples the flexible member may be coupled to the substrate. The flexible member may be coupled to the substrate on either side of the bendable portion. The flexible member may be coupled to the substrate to allow for relative movement between the flexible member and the substrate.

In some examples the support structure may comprise a rigid member wherein the rigid member may be pivotably connected to the substrate on either side of the bendable portion. The rigid member is configured to be moved between a horizontal position when the apparatus is in an open configuration and a vertical position when the apparatus is in a closed configuration. The rigid member may comprise two members configured to pivot relative to each other.

In some examples the support structure may also provide support to the substrate when the display is not in the closed configuration.

In some examples the bendable portion of the substrate may comprise a mesh structure.

In some examples the display may be continuous across the bendable portion.

In some examples when the display is in the closed position a first portion of the display and a second portion of the display may be configured to face each other.

The apparatus may be an apparatus such as a communications apparatus or a gaming apparatus which may enable wireless communication.

BRIEF DESCRIPTION

Figure 3A:
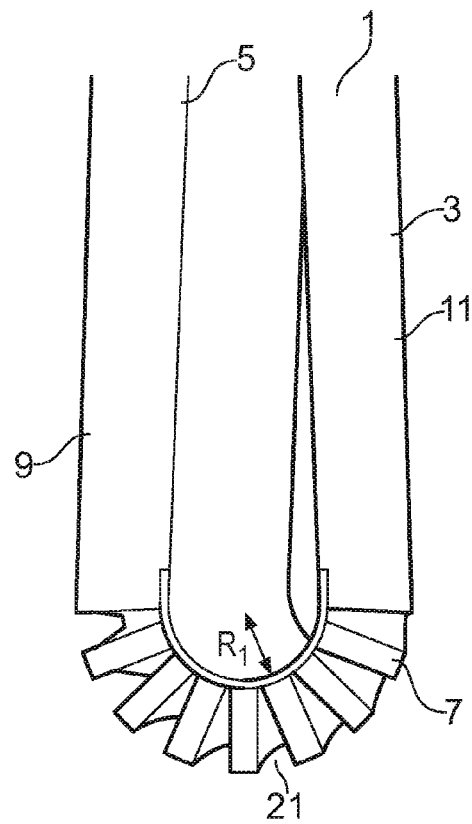
Figure 3B:
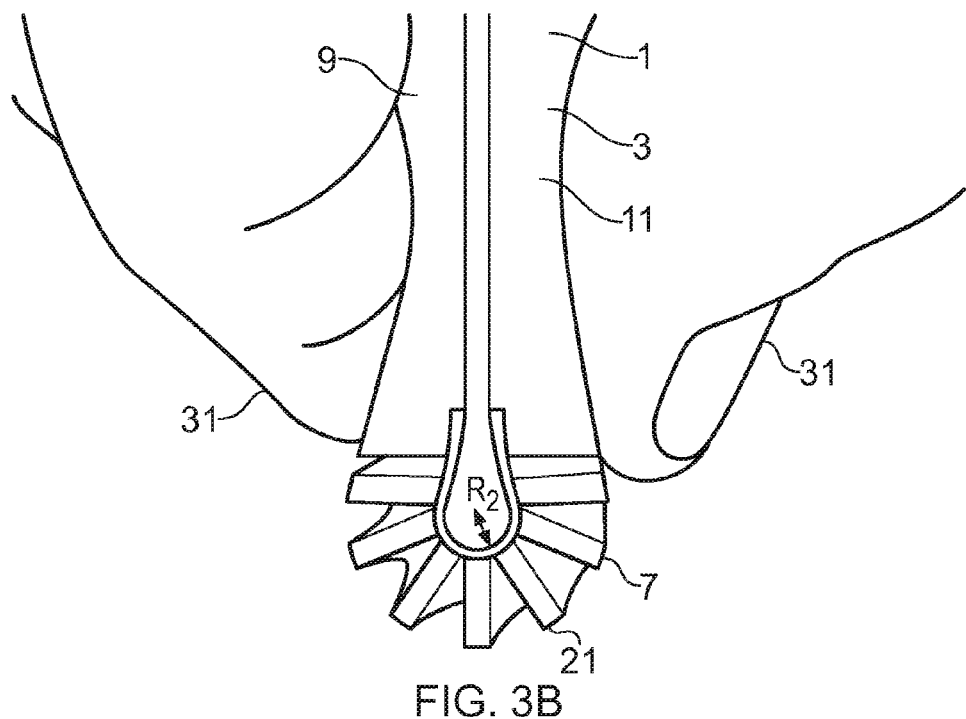
Figure 4:
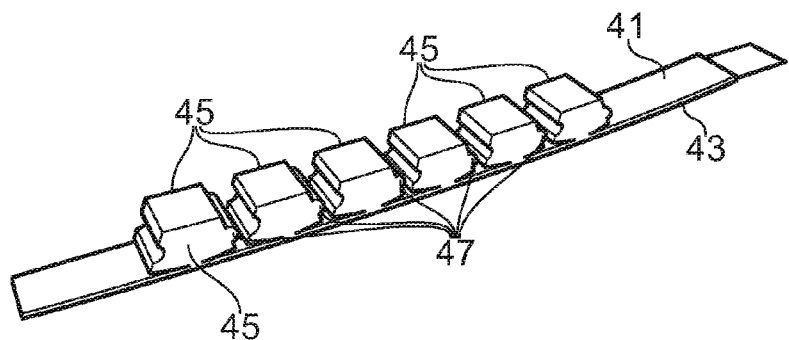
Figure 5A:
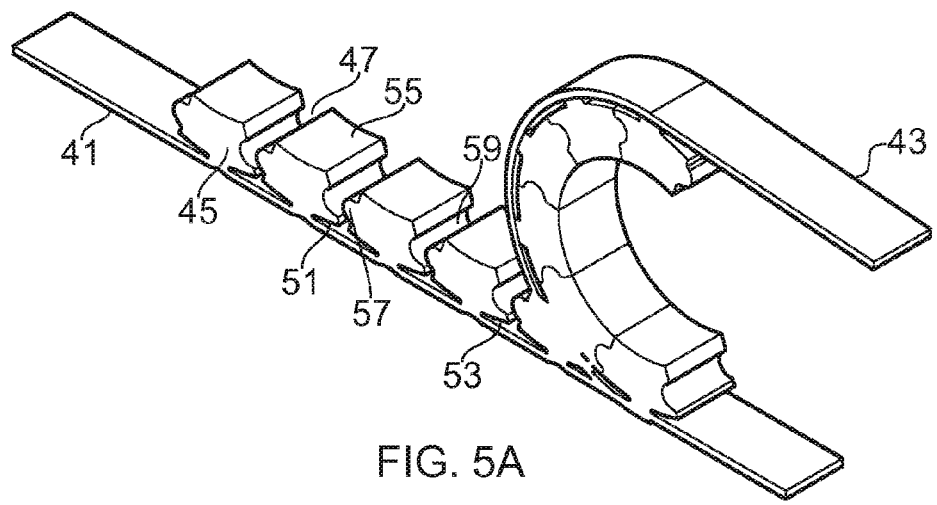
Figure 5B:
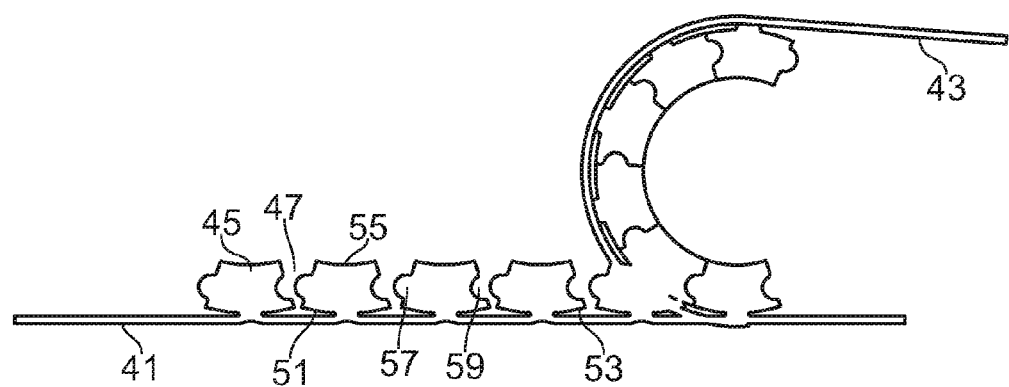
Figure 12A:
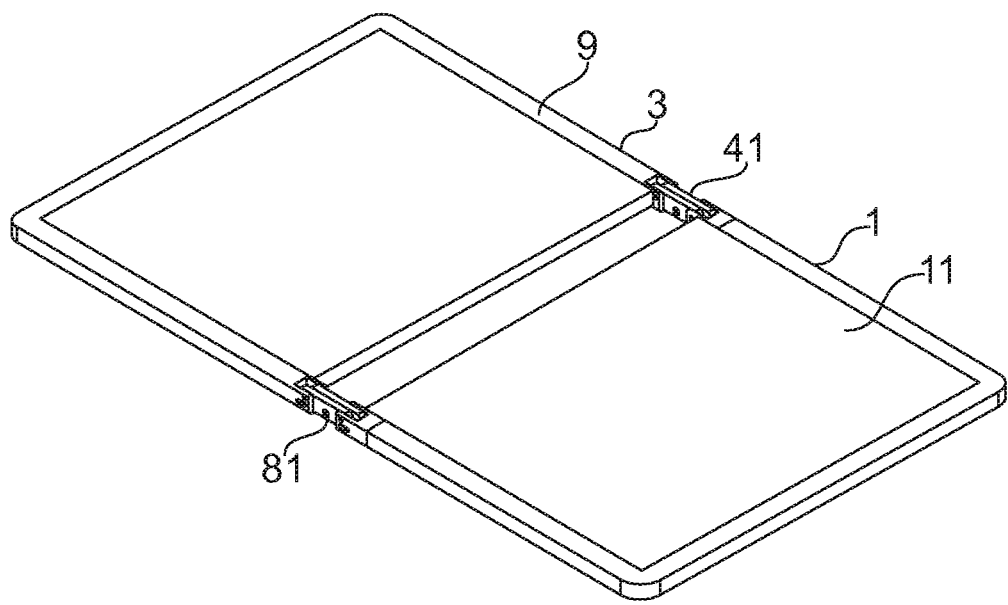
Figure 12B:
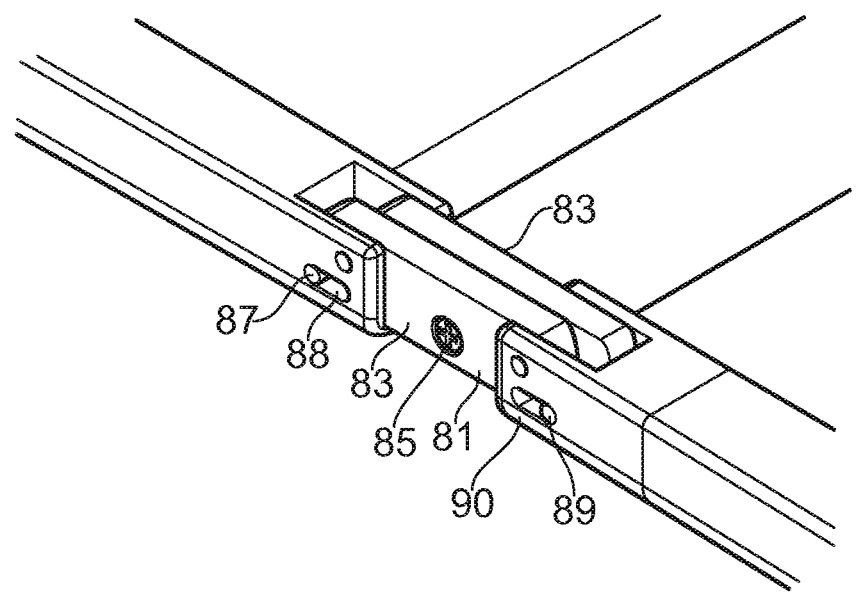
Figure 14A:
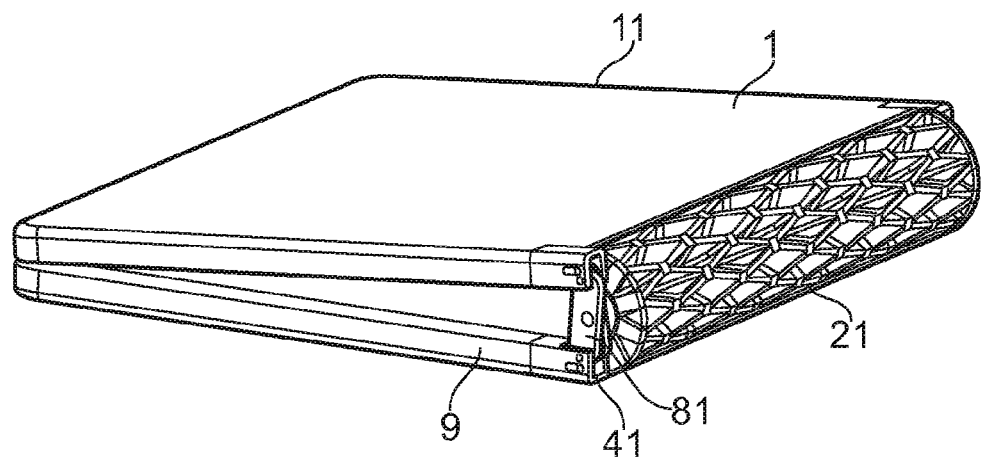
Figure 14B:
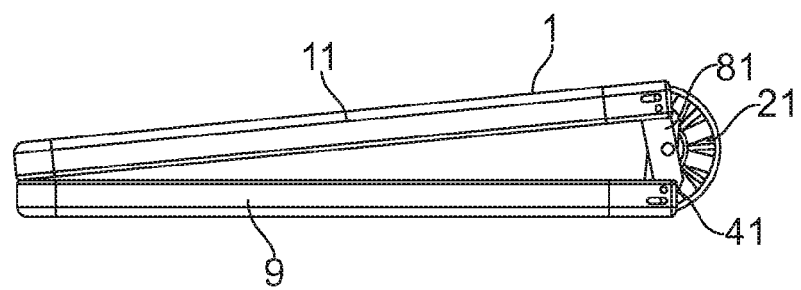
Figure 15A:
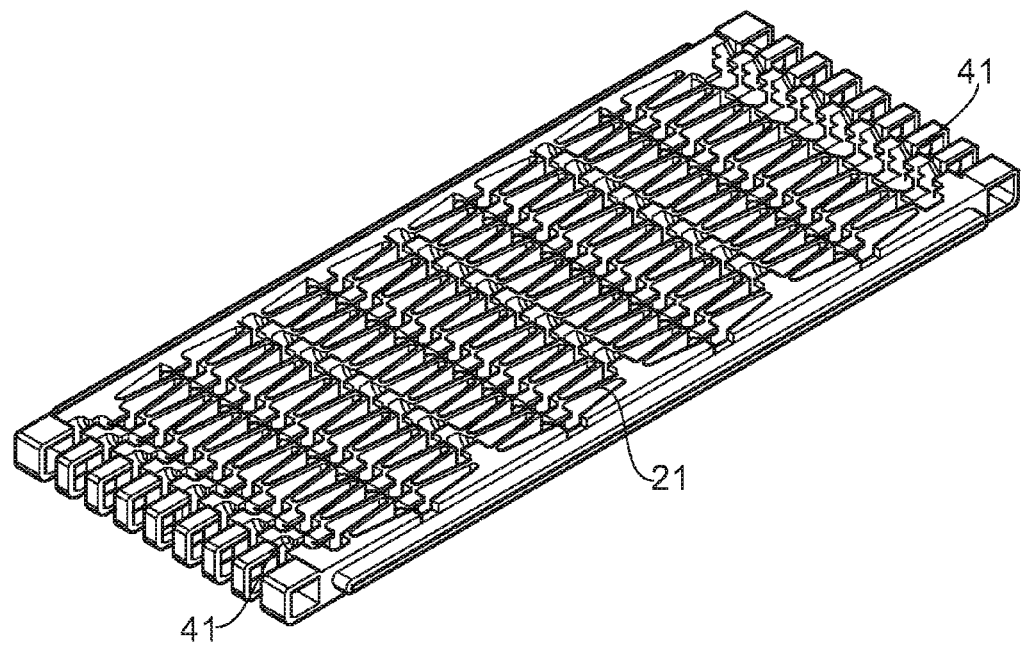
Figure 15B:
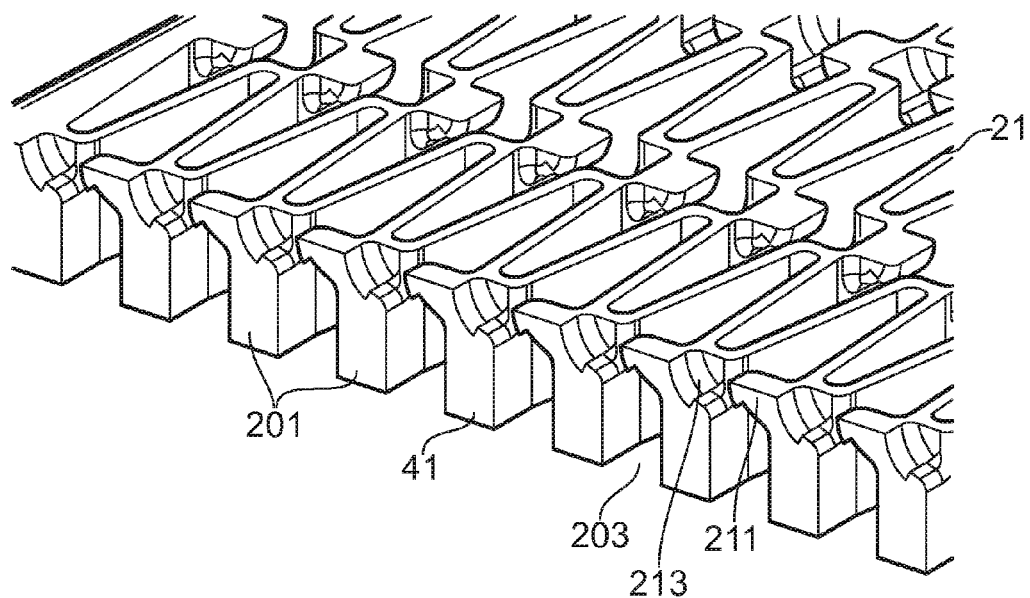
Figure 16:
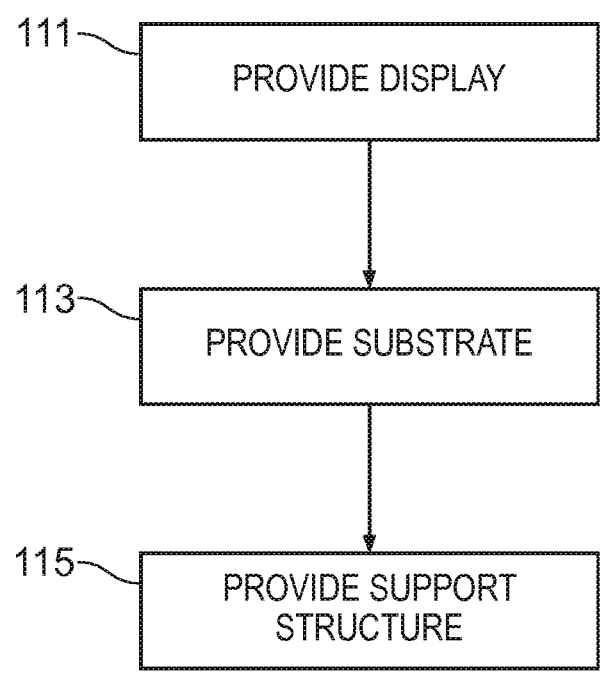

For a better understanding of various examples that are useful for understanding the detailed description, reference will now be made by way of example only to the accompanying drawings in which:

FIG. 1 illustrates an apparatus;
FIGS. 2A to 2D illustrate an apparatus;
FIGS. 3A and 3B illustrate an apparatus;
FIG. 4 illustrates a support structure;
FIGS. 5A and 5B illustrate a support structure;
FIGS. 6A to 6D illustrate an apparatus;
FIG. 7 illustrates an apparatus;
FIGS. 8A to 8E illustrate an apparatus;
FIGS. 9A to 9B illustrate a support structure;
FIGS. 10A to 10B illustrate a support structure;
FIGS. 11A to 11B illustrate an apparatus;

FIGS. 12A and 12B illustrate an apparatus;
FIGS. 13A to 13D illustrate an apparatus;
FIGS. 14A and 14B illustrate an apparatus;
FIGS. 15A and 15B illustrate an apparatus; and
FIG. 16 illustrates a method.

DETAILED DESCRIPTION

The Figures illustrate an apparatus 1 comprising: a bendable display 5; a substrate 3 configured to support the bendable display 5 wherein the substrate 3 comprises at least one bendable portion 7 configured to enable the bendable display 5 to be moved between an open configuration and a closed configuration; and a support structure 41 provided adjacent to the bendable portion 7 of the substrate 3 configured to provide a rigid support for the bendable portion 7 of the substrate 3 at least when the display 5 is in the closed configuration.

FIG. 1 illustrates an apparatus 1 according to an example of the disclosure. The apparatus 1 comprises a substrate 3 and bendable display 5.

The apparatus 1 may be provided within a device such as an electronics communication device. The apparatus 1 and/or the electronics communication device may be configured for wireless communication. For example the electronics communication device may be a mobile cellular telephone or a tablet computer or any other device which may be connected to a wireless network to enable the apparatus 1 to send and receive data. The apparatus 1 may be configured to control the display 5 to display data which has been sent or received by the electronics communication device or other information.

The apparatus 1 may be a handheld apparatus 1 which a user may be able to carry in their hand.

The display 5 may comprise any means which enables items such as images or text or any other suitable information to be displayed to a user of the apparatus 1. The display 5 may be a touch sensitive display 5 which may be responsive to a user actuating the surface of the display 5 to enable the user to control the apparatus 1.

The display 5 may be a bendable display 5. The bendable display 5 may be bent or otherwise deformed in response to a force applied by a user of the apparatus 1. The bendable display 5 may be, for example, a flexible OLED (organic light emitting diode) display, or any other suitable type of display.

The substrate 3 may be configured to support the bendable display 5. The substrate 3 may comprise a flat or substantially flat surface on which the display 5 may be mounted. In some examples the display 5 may be fixed to the surface of the substrate 3. For example, the display 5 may be adhered to the surface of the substrate 3. It is to be appreciated that other means of attaching the display 5 to the substrate 3 may also be used.

The substrate 3 comprises at least one bendable portion 7. In the example of FIG. 1 one bendable portion 7 is provided. The bendable portion is provided at the midpoint of the substrate 3. It is to be appreciated that in other examples more than one bendable portion 7 may be provided. It is also to be appreciated that in other examples the bendable portion 7 may be provided in other positions of the substrate 3.

The bendable portion 7 may comprise a hinge. The hinge may comprise a living hinge which may be made out of the same material as the portions connected by the hinge. This may reduce the number of components of the apparatus 1 which may make the apparatus 1 simpler to assemble.

In the example of FIG. 1 the bendable portion 7 may comprise a mesh section within the substrate 3. An example mesh structure is illustrated in more detail in FIGS. 2A to 2D.

The bendable portion 7 divides the substrate 3 into two regions 9, 11. As illustrated in FIG. 1 first region 9 is provided on the left hand side of the bendable portion 7 and the second region 11 is provided on the right hand side of the bendable portion 7. In the example of FIG. 1 each of the regions 9, 11 are the same size or approximately the same size. In other examples the regions may be different sizes and/or shapes.

In some examples the regions 9, 11 of the substrate 3 on either side of the bendable portion 7 may be rigid or substantially rigid. The regions 9, 11 of the substrate 3 may be rigid so as to prevent the display 5 from being deformed by the user in any region other than the bendable portion 7.

The display 5 and the substrate 3 may be arranged so that the display 5 is continuous across the bendable portion 7. The display 5 may be configured so that information may be displayed in the portion of the display 5 which is overlaying the bendable portion 7 of the substrate 3. In examples where the display 5 comprises a touch sensitive display 5 the display 5 may be configured so that a user can actuate the display 5 in the portion of the display 5 which is overlaying the bendable portion 7 of the substrate 3.

In the example of FIG. 1 the substrate 3 and bendable display 5 can be moved between an open configuration and a closed configuration as illustrated in FIG. 1. In some examples the apparatus 1 may also be arranged in a partially open configuration which may comprise any configuration between the flat and fully folded configurations.

In FIG. 1 the example apparatus 1 is illustrated in a closed configuration. In the closed configuration the two regions 9, 11 of the substrate 3 overlay each other. In the particular example of FIG. 1 the two regions 9, 11 are arranged overlaying each other so that a first portion of the display 5 and a second portion of the display 5 are facing each other. It is also to be appreciated that the apparatus could be configured in an open configuration. In the open configuration the two regions 9, 11 of the substrate 3 are arranged adjacent to each other so that the display 5 provides a continuous flat or substantially flat surface.

Apparatus 1 such as the example apparatus of FIG. 1 provides an apparatus 1 with a large display 5 which a user may prefer. However the apparatus 1 can be folded when it is not in use which may make the apparatus 1 easier and more convenient for a user to carry.

FIGS. 2A to 2D illustrate the mesh 21 in the bendable portion 7 of the substrate 3 in more detail. The mesh 21 provides a net or interleaved structure which can be compressed or stretched to allow for relative movement of the first region 9 of the substrate 3 and the second region 11 of the substrate 3.

Figure 2A:
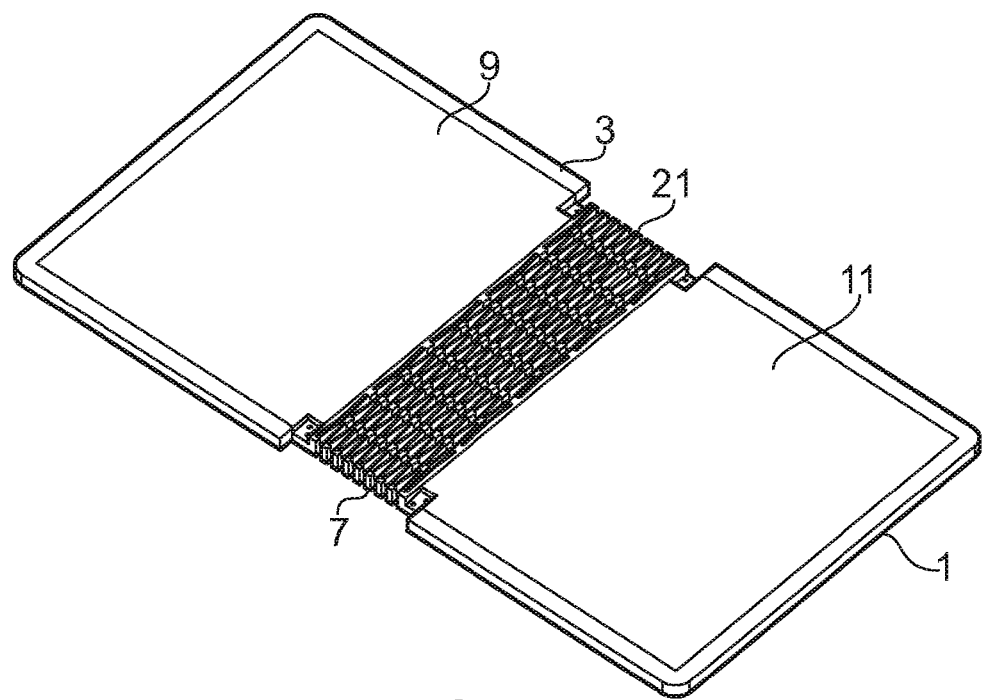
Figure 2B:
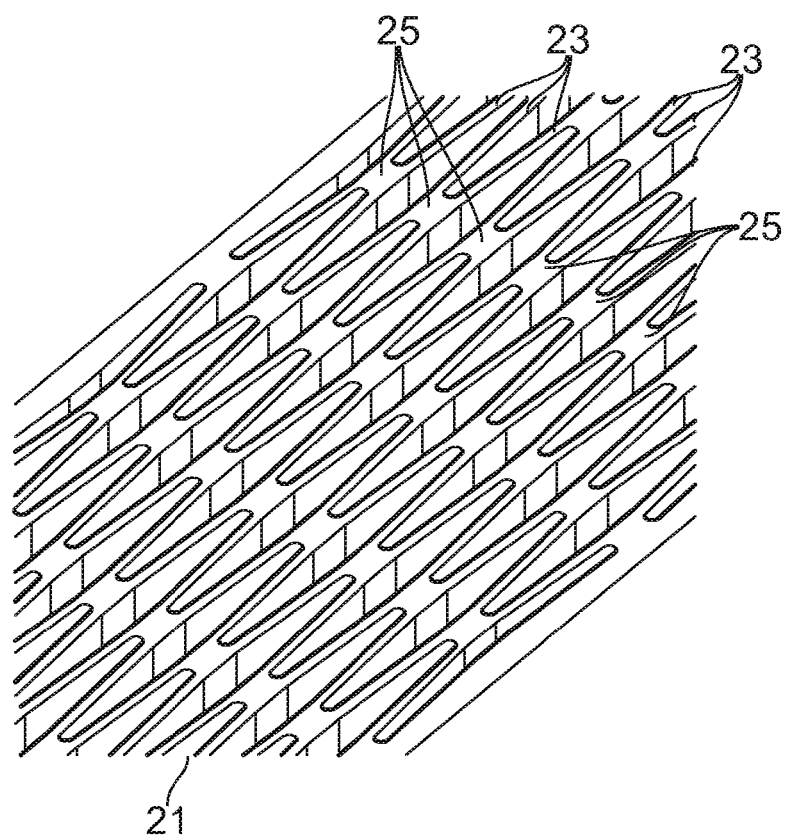

FIG. 2A illustrates the substrate 3 with the mesh 21 in an expanded state. FIG. 2B illustrates the mesh 21 in the expanded state. The mesh 21 may be manufactured in the expanded state. The mesh 21 may be formed as an integral part of the substrate 3. The mesh 21 and/or the substrate 3 may be manufactured by molding or any other suitable technique.

The mesh 21 comprises a series of flexible strands 23. The flexible strands 23 are connected to each other by a plurality of connecting points 25. The connecting points 25 may be provided at regular intervals along the length of the strands 23. As the strands 23 are flexible this allows for the mesh 21 to be stretched and compressed which enables the relative movement of the first region 9 of the substrate 3 and the second region 11 of the substrate 3.

Figure 2C:
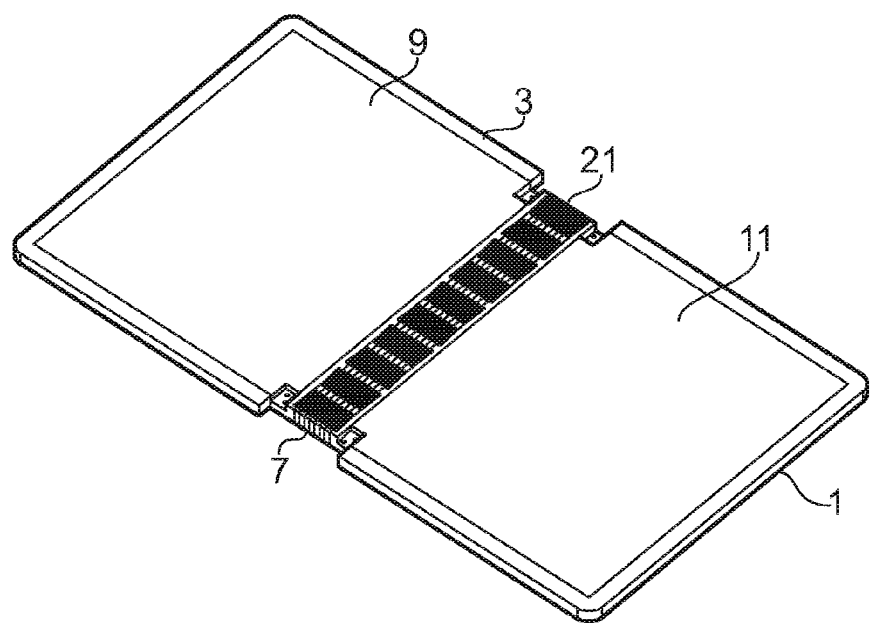
Figure 2D:
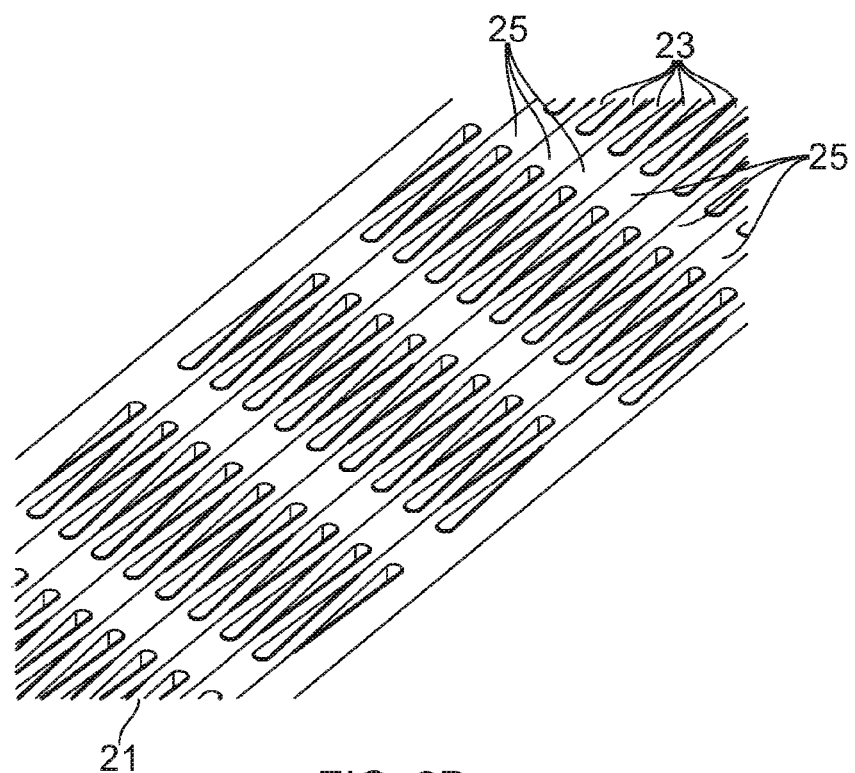

FIG. 2C illustrates the substrate 3 with the mesh 21 in a compressed state. FIG. 2D illustrates the mesh 21 in the compressed state. The mesh 21 may be arranged into the compressed state when the display 5 is attached to the substrate 3.

In the compressed state the strands 23 of the mesh 21 are pressed against each other. The display 5 may then be mounted on the substrate 3 and the compressed mesh 21. As the display 5 is fixed to the substrate 3 it may keep the mesh 21 in the compressed state. In some examples the display 5 may be fixed to the substrate 3 so as to allow folding of the bending portion 7 but to prevent lateral compression or stretching of the bendable portion 7.

FIGS. 3A and 3B illustrate a side view of the bendable portion 7 of the substrate 3 when the apparatus 1 is arranged in the closed configuration.

In FIG. 3A the apparatus 1 is arranged in the closed configuration. In the bendable region the display 5 has a first radius of curvature $R_1$. The radius of curvature $R_1$ may be such that the stresses and strains within the display 5 are below a threshold. The threshold stresses and strains may be such that the display 5 can be moved between the open and closed configurations many times, for example tens of thousands of times, without damage to the display 5.

In FIG. 3B the apparatus 1 is arranged in a closed configuration but additional forces are applied to the apparatus 1. In the particular example of FIG. 3A the substrate 3 is being pressed by the user's fingers 31. This additional force provided by the user has caused further bending of the bendable portion 7.

In the closed and compressed configuration of FIG. 3B the display 5 has a second radius of curvature $R_2$. The second radius of curvature $R_2$ may be larger than the first radius of curvature $R_1$. The display 5 may be more bent or more deformed in the closed and compressed configuration than in the closed configuration. If the display 5 is bent or deformed too much the stresses and strains within the display 5 may lead to failure of the display 5.

In FIG. 3B the apparatus 1 is being compressed by the user's fingers 31. It is to be appreciated that the apparatus 1 may be compressed unintentionally, for example if the apparatus 1 was accidentally sat on or stood on or if heavy objects were placed on top of the apparatus 1. It is useful to provide a means for preventing the apparatus 1 from being further compressed in the closed configuration as this may protect the display 5 and other electronic components in the apparatus 1.

FIG. 4 illustrates a first example of a support structure 41 which may be configured to provide a rigid support for the bendable portion 7 of the substrate 3 when the substrate 3 is in the closed configuration.

In the particular example of FIG. 4 the support structure 41 comprises a flexible member 43. The flexible member 43 may comprise a thin sheet. In some examples the sheet may comprise a material such as a metal. The flexible member 43 may be easily moved between a flat and a folded or closed configuration.

In the example of FIG. 4 the flexible member 43 may be an elongate member. The flexible member 43 may have a length which is several times greater than its width. This may allow the support structure 41 to be positioned adjacent to the bendable portion 7 of the substrate 3 without increasing the width of the substrate 3 too much.

A plurality of rigid projections 45 are provided on the flexible member 43. In the particular example of FIG. 4 six projections 45 are provided however in other examples other numbers of projections 45 may be provided.

The rigid projections 45 are arranged on the flexible member 43 so that a small gap 47 is provided between each of the projections 45. This may allow for relative movement of the projections 45 as the flexible member 43 is folded and unfolded.

The projections 45 may be made of any suitable material. The projections 45 may be made out of a rigid material such as plastic. The projections 45 may be formed by any suitable method such as molding.

FIGS. 5A and 5B illustrate a support structure 41 in an open and a closed configuration. FIG. 5A provides a perspective view and FIG. 5B provides a side view.

In the open configuration the flexible member 43 is flat or substantially flat. The projections 45 are spaced from each other so that there is a small gap 47 between each of the projections 45. In the particular example of FIG. 5 when the support structure 41 is in the open configuration there is no physical contact between the projections 45. This may allow for movement of the flexible member 43 when the support structure 41 is in the open configuration.

In the example of FIGS. 5A and 5B the projections 45 have the same cross sectional shape. In FIGS. 5A and 5B each of the projections 45 have the same cross sectional shape. In other examples the projections 45 may have different cross sectional shapes.

The projections 45 may have a height which is the same as the thickness of the substrate 3. This may enable the support structure 41 to be coupled to the apparatus 1 without increasing the overall thickness of the apparatus 1.

The projections 45 have a curved lower surface 51. A part of the curved lower surface 51 is connected to the flexible member 43. This creates a gap 53 between the flexible member 43 and the lower surface 51 of the projection 45. This may allow for the flexible member 43 to be moved relative to the projections 45. In particular it may allow for the flexible member 43 to be rolled up from the open configuration into the closed configuration.

The projections 45 have a tapered cross sectional shape. The projections 45 are wider at the lower surface 51 than on the upper surface 55. The shape of the projections may be such that the flexible member 43 can be rolled to a closed configuration. Once the flexible member 43 is in the closed configuration the projections 45 are in contact with each other. This may create a rigid structure which may prevent further compression of the support structure 41.

In the example of FIGS. 5A and 5B the projections 45 also comprise interlocking portions. In the particular example of FIGS. 5A and 5B the interlocking portions comprise a protrusion 57 which is provided on a side of a projection 45. In the particular example of FIG. 5 a protrusion 57 may be provided on each projection 45. The protrusions 57 may be configured to fit into corresponding recesses 59 on adjacent projections 45. The protrusions 57 and recesses 59 may be arranged so that when the support structure 41 is arranged in the closed configuration the protrusions 57 fit into the recess 59. This may hold the projections 45 in position relative to each other. This may provide a stronger support structure 41 when the flexible member 43 is arranged in the closed configuration. This may also prevent the support structure 41 from being deformed in other ways such as twisting or rotation when the support structure 41 is in the closed configuration.

The support structure 41 may provide a rigid frame which may prevent the radius of curvature of the bendable portion 7 from exceeding a threshold when the support structure 41 is coupled to the substrate 3.

FIGS. 6A to 6D illustrate an example support structure 41 coupled to a substrate 3. The support structure 41 may be provided adjacent to the bendable portion 7 of the substrate 3. The flexible member 43 of the support structure 41 may be coupled to the substrate 3. The flexible member 43 may be coupled to the substrate 3 on either side of the bendable portion 7. The flexible member 43 may be coupled to the substrate 3 to allow for relative movement between the flexible member 43 and the substrate 3. This may allow for the support structure 41 and the substrate 3 to be moved between the open and closed configurations as illustrated in FIGS. 5A and 5B.

Figure 6A:
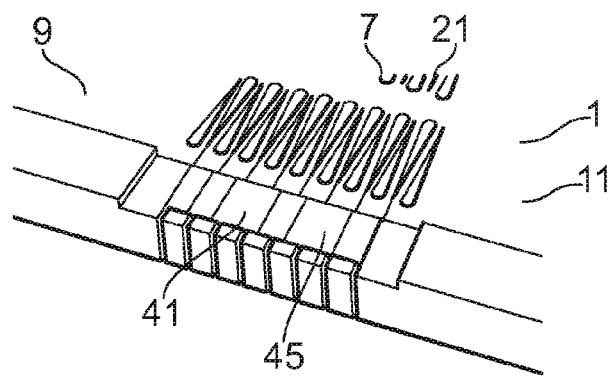
Figure 7:
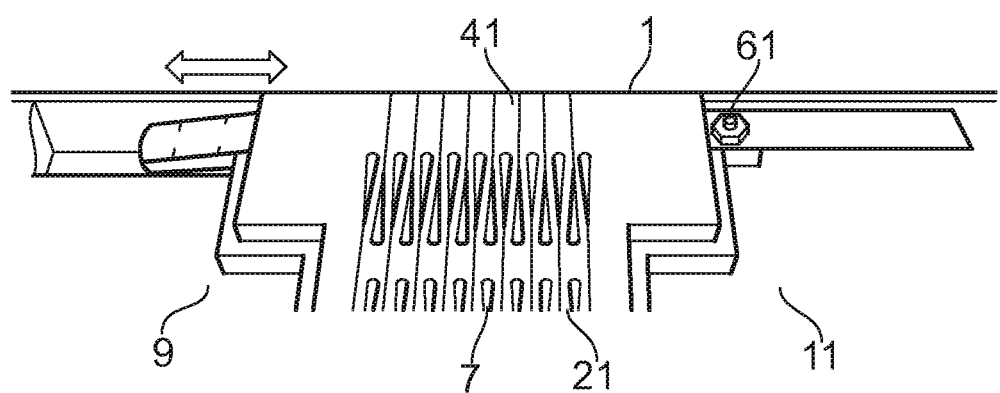

In FIG. 6A the substrate 3 and the support structure 41 are in the open configuration. In the open configuration the angle between the first region 9 of the substrate 3 and the second region 11 of the substrate 3 is 180 degrees or substantially 180 degrees. The mesh 21 is in a compressed state and the flexible member 43 is in the flat state so that the protrusions 45 of the support member 41 are not in contact with each other. In such a configuration the user may access and view the display 5.

In the open configuration the projections 45 of the support structure 41 are in the flat configuration so a small gap 47 is provided between each of the projections 45.

Figure 6B:
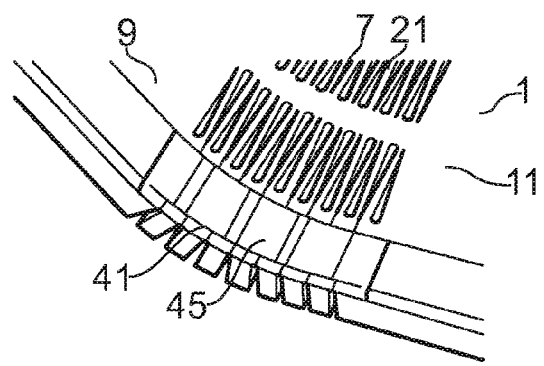

In FIG. 6B the user starts to move the apparatus 1 into the closed configuration by folding the apparatus 1. This causes a curvature of the mesh 21 and the flexible member 43. This decreases the gap 47 between the projections 45 and brings the inner surface of the projections 45 of the support structure 41 closer together.

In FIG. 6B the apparatus 1 is in a partially open configuration. In the partially open configuration the angle between the first region 9 of the substrate 3 and the second region 11 of the substrate 3 is an obtuse angle. In the partially open configuration the angle between the first region 9 of the substrate 3 and the second region 11 of the substrate 3 is between 90 and 180 degrees. In the particular example of FIG. 6B the angle between the first region 9 of the substrate 3 and the second region 11 of the substrate 3 is approximately 135 degrees.

In some examples the apparatus 1 may be held in this position so that the apparatus 1 will only move out of the position if a force is applied to the apparatus 1 by a user.

Figure 6C:
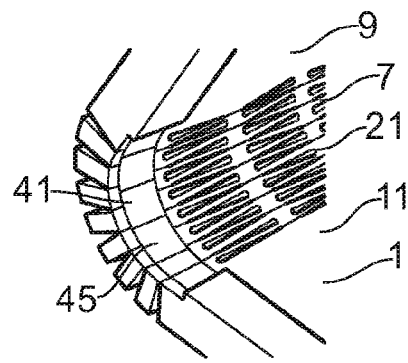

In FIG. 6C the user has continued to fold the apparatus 1 so that the apparatus 1 is still in a partially open configuration but is now closer to the closed configuration. In the partially open configuration of FIG. 6C the angle between the first region 9 of the substrate 3 and the second region 11 of the substrate 3 is an acute angle. In the partially open configuration of FIG. 6C the angle between the first region 9 of the substrate 3 and the second region 11 of the substrate 3 is between 0 and 90 degrees.

This has caused further curvature of the mesh 21 and the flexible member 43 and further decreased the gap 47 between the projections 45 bringing the inner surfaces of the projections 45 of the support structure 41 closer together.

Figure 6D:
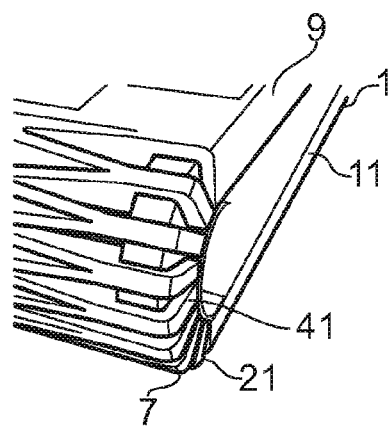

In FIG. 6D the user has continued to fold the apparatus 1 so that the apparatus 1 is in a closed configuration. In the closed configuration the first region 9 and the second region 11 of the substrate 3 may be arranged overlaying each other. In some examples, when the apparatus 1 is in the closed configuration at least a part of the first region 9 and at least a part of the second region 11 may be in contact with each other.

When the apparatus 1 is arranged in the closed configuration the projections 45 of the support structure contact each other. This may prevent the flexible member 43 being further compressed. As the support structure 41 is coupled to the substrate 3 this may also prevent further compression of the substrate 3 which may protect the display 5 and other electronic components in the apparatus 1.

FIG. 7 illustrates an example of the support structure 41 connected to the substrate 3. The flexible member 43 of the support structure 41 is fixed to one region 11 of the substrate 3. In the example of FIG. 7 the flexible member 43 is fixed by a screw 61 to the substrate 3. It is to be appreciated that in other examples other fixing means could be used instead.

The other end of the flexible member 43 may be coupled to the other region 9 of the substrate 3 so as to allow for linear movement of the flexible member 43 relative to the substrate 3. This allows for the fact that when the mesh is folded, the inner surface of the apparatus 1 has a smaller circumference than the outer surface of the apparatus 1.

In some examples an additional section may be added onto the flexible member 43. The additional part may be a metal section. The metal section could be welded onto the apparatus. The metal section may enable the support structure 41 to be coupled to the apparatus 1. In some examples the additional metal section may form part of a locking mechanism.

The apparatus 1 may comprise locking mechanisms which may be configured to hold regions 9, 11 of the substrate 3 in position relative to each other. The locking mechanisms may be configured to lock the apparatus 1 in the open configuration and the closed configuration. In some examples the locking mechanism may comprise mechanisms configured to hold the apparatus 1 in a partially open configuration.

In some examples the apparatus 1 the locking mechanisms may comprise a magnet. The magnet may be configured on one of the regions 9, 11 of the substrate 3. The magnet may be configured to provide an attractive force between a corresponding magnet or piece of metal on the other region 9, 11 of the substrate so as to hold the two substrates in position relative to each other.

In some examples of the apparatus 1 may also comprise mechanical locking mechanisms which may be configured to lock the apparatus 1 in respective configurations. In some examples the apparatus 1 may comprise a viscous or dry friction damper to control the movement of the apparatus 1 between the open and closed configurations.

Figure 8A:
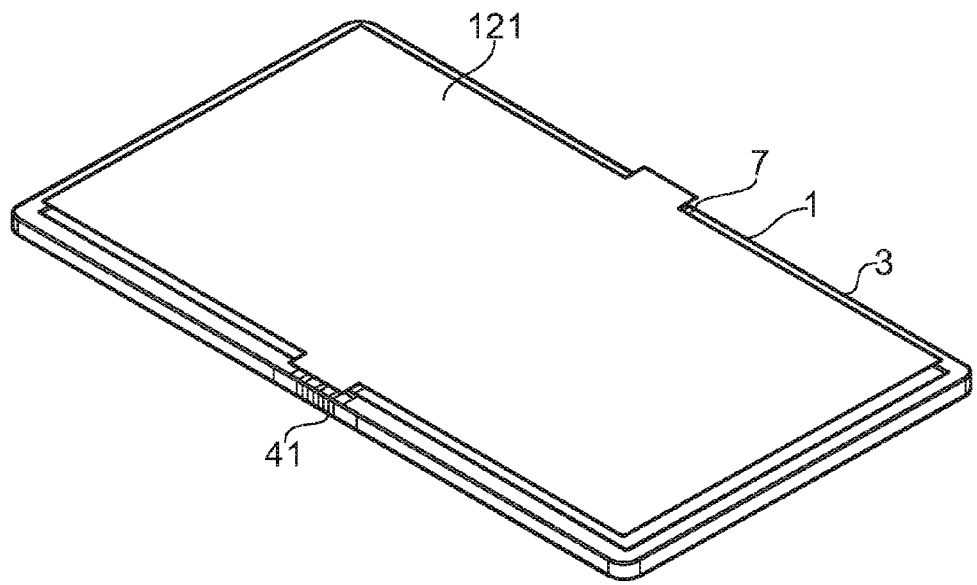

FIGS. 8A to 8E illustrate examples of a support structure 41 coupled to an apparatus 1. The apparatus 1 comprises a flexible substrate 3 with a bendable portion 7, as described above. In the example of FIG. 8A a metal sheet 121 is provided on the substrate 3. The metal sheet 121 may be a flexible metal sheet. The metal sheet 121 may be adhered to the flexible substrate 121. The display 5 may be positioned overlaying the metal sheet 121.

In the example of FIG. 8A the support structure is coupled to the substrate 3 and is positioned adjacent to the bendable portion. In the examples of FIGS. 8A to 8E only one support structure 41 is illustrated. It is to be appreciated that more than one support structure 41 may be provided, for example, there may be a support structure 41 provided on either side of the bendable portion 7.

The support structure 41 may be coupled to the substrate 3 so that the support structure 41 does not extend out of the side of the substrate 3. This may allow a support structure 41 to be provided without increasing the overall size of the apparatus 1.

The apparatus 1 may be configured to provide further support for the support structure 41. The further support may be provided by the substrate 3 and/or the metal sheet 121 and/or any other component of the apparatus 1.

Figure 8B:
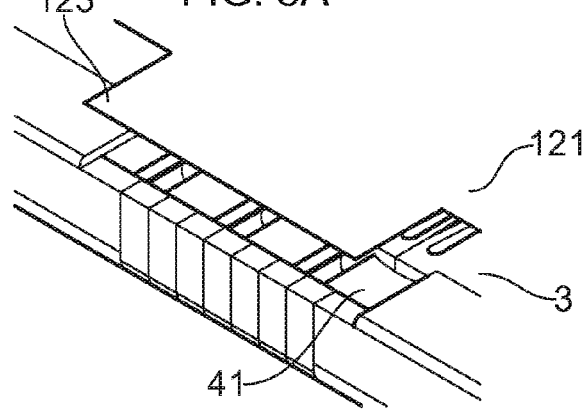
Figure 9A:
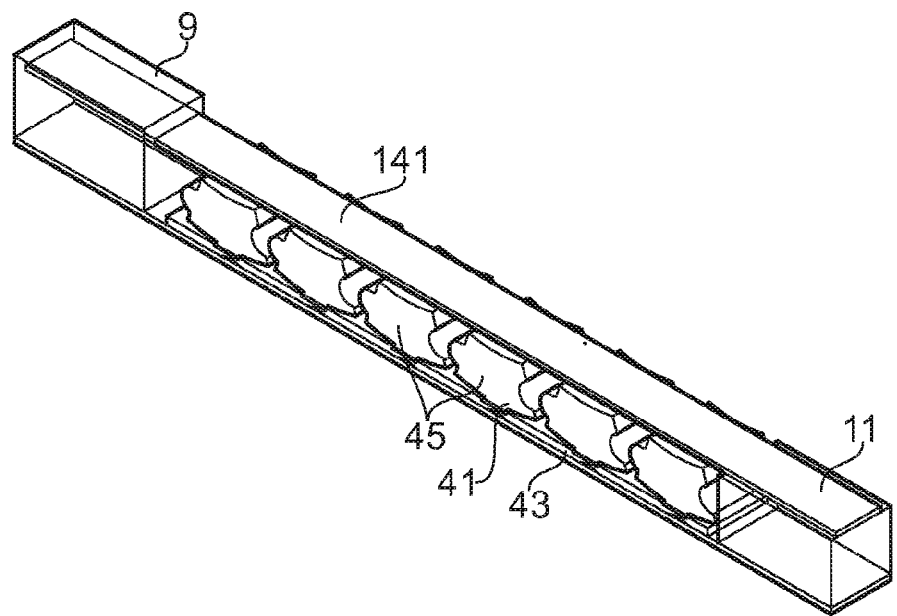
Figure 9B:
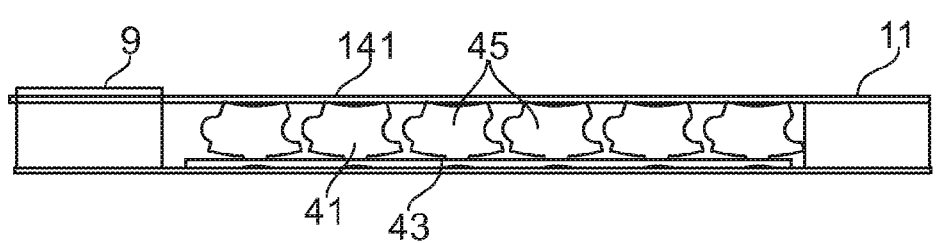

In the example of FIG. 8B further support is provided by the flexible metal sheet 121. In the particular example of FIG. 8B the flexible metal sheet comprises a flange 123 which extends over the support structure 41. The flange 123 may be configured to bend as the substrate 3 bends. In the example of FIG. 8B the flange 123 provides support for the upper surface of the support structure 41. This may prevent the support structure 41 from bending in a way which may cause damage to the display 5.

Figure 8C:
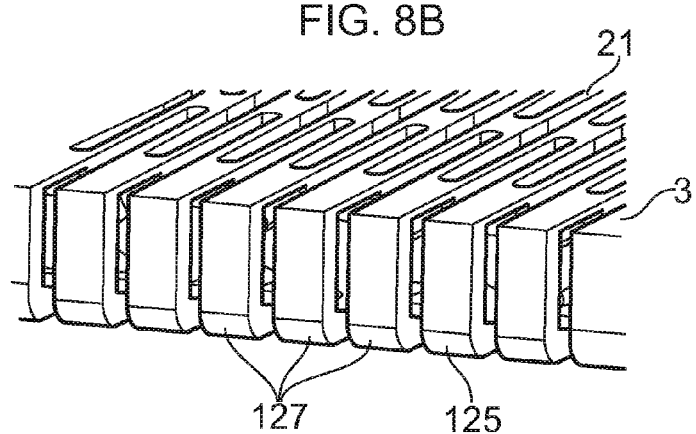

In the example of FIG. 8C the further support is provided by a frame 125. The frame 125 may be integrated into the substrate 3. The frame 125 may be integrated into the mesh 21 of the substrate 3. The frame 25 may comprise a plurality of members 127. The support structure 41 may be positioned inside of the plurality of members 127 so that the members 127 allow the support structure 41 to be moved between the open and closed configurations but prevent the support structure 41 from bending in a way which may cause damage to the display 5.

Figure 8D:
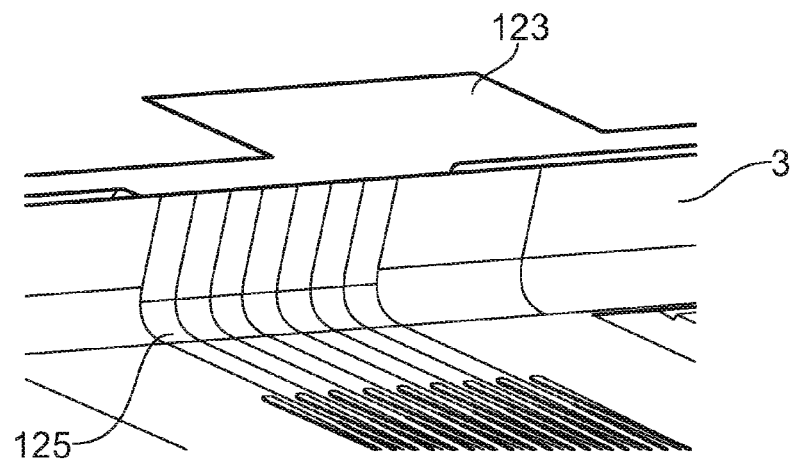

In the example of FIG. 8D the further support is provided to the support structure 41 on the lower side of the support structure 41. This support may be provided by a frame 125 or a portion of a frame 125 which provides support for the lower side of the support structure 41 and may also prevent the support structure 41 from bending in a way which may cause damage to the display 5.

Figure 8E:
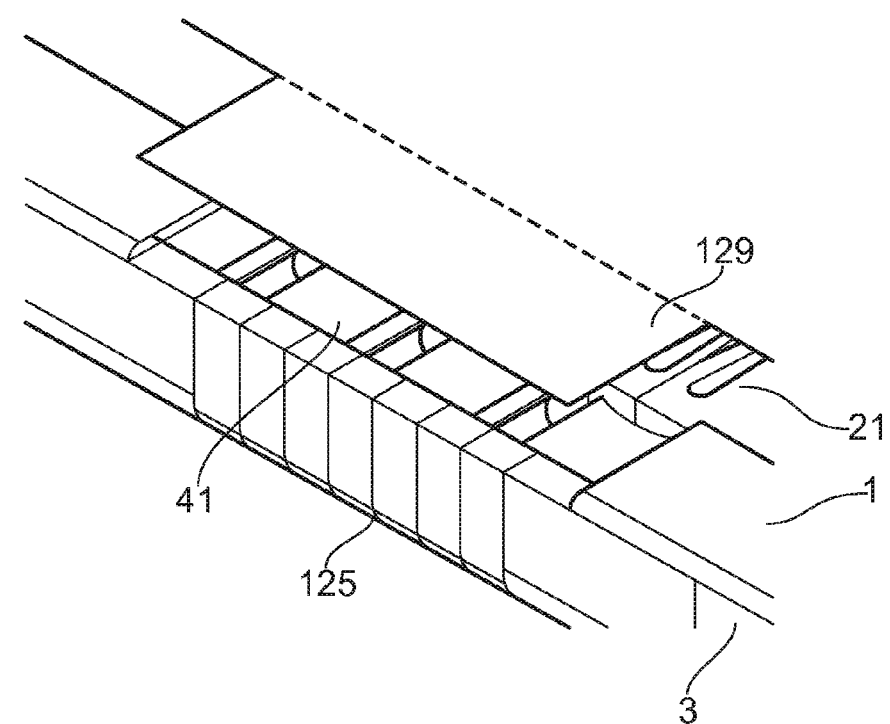

In the example of FIG. 8E the further support is provided by an additional support member 129. The additional support member 129 may be provided overlaying the support structure 41 adjacent to the flexible metal sheet 121. The additional support member 129 may be made of any suitable material. The additional support member 129 may be configured to prevent the support structure 41 from bending in a way which may cause damage to the display 5.

FIGS. 9A to 9B illustrate an example support structure 41 according to examples of the disclosure. FIG. 9A illustrates the support structure 41 in a perspective view and FIG. 9B illustrates a cross section through the support structure 41. The support structure 41 comprises a flexible member 43 and a plurality of projections 45 as described above. A further flexible member 141 is also provided overlaying the projections 45. In the examples of FIGS. 9A and 9B the further flexible member 141 comprises a flat sheet. The further flexible member 141 extends over all of the projections 45. The further flexible member 141 may be configured so that when the support structure 41 is coupled to the substrate 3 the further flexible member 141 extends between the first region 9 of the substrate 3 and the second region 11 of the substrate 3.

This further flexible member 141 may act as additional support to prevent the support structure 41 from bending in a way which may cause damage to the display 5. The relative movement between the further flexible member 141 and the substrate 3 as the apparatus 1 is moved between the open and closed configurations may enable the apparatus 1 to be locked or held in certain positions.

FIGS. 10A to 10B illustrate another example support structure 41 according to examples of the disclosure. FIG. 10A illustrates the support structure 41 in a perspective view and FIG. 10B illustrates a cross section through the support structure 41. The support structure 41 comprises a flexible member 43 and a plurality of projections 45 as described above. A further flexible member 151 is also provided overlaying the projections 45. In the examples of FIGS. 10A and 10B the further flexible member 151 comprises a flexible wire 147. The flexible wire 147 extends through all of the projections 45. The flexible wire 147 may be configured so that when the support structure 41 is coupled to the substrate 3 the flexible wire 147 extends between the first region 9 of the substrate 3 and the second region 11 of the substrate 3.

This flexible wire 147 may act as additional support to prevent the support structure 41 from bending in a way which may cause damage to the display 5. The flexible wire may be positioned close to the upper surface of the projections 45. The relative movement between the flexible wire 147 and the substrate 3 as the apparatus 1 is moved between the open and closed configurations may enable the apparatus 1 to be locked or held in certain positions.

FIGS. 11A and 11B illustrate examples of locking mechanisms which may be used with the support structures 41 as described above. These locking mechanisms use the fact that the bending of the apparatus 1 from the open configuration into the closed configuration causes relative movement between the flexible member 43 and the further flexible member 141 and the regions 9, 11 of the substrate 3.

The locking mechanisms comprise a plurality of recesses 153 and a projection 155. The projections 155 are configured to fit in the recesses 153 when the apparatus 1 is in a locked position.

In the example of FIG. 11A the projection 155 comprises a substantially spherical shape which is shaped and sized so as to fit into a circular recess 153. In the example of FIG. 11B the projection 155 comprises a triangular shape which is shaped and sized so as to fit into a corresponding triangular recess 153.

The projections 155 may be provided on a further flexible member 141 as described above and the recesses 153 may be provided on the substrate 3. This may enable the projections 155 to be moved between the locking recesses 153 as the apparatus 1 is moved between open and closed configurations.

FIGS. 12A and 12B illustrate another example of the disclosure comprising a different type of support structure 41. FIG. 12A illustrates an example apparatus 1 in an open configuration. The apparatus 1 may comprise a substrate 3 and a display 5 as described above. FIG. 12B illustrates the support structure 41 in more detail.

In the example of FIGS. 12A and 12B the support structure 41 comprises a rigid member 81. The rigid member 81 is pivotably connected to the substrate 3 on either side of the bendable portion 7. The rigid member 81 may have a width which is less than or the same as the thickness of the substrate 3. This may allow the support structure 41 to be coupled to the apparatus 1 without increasing the overall thickness of the apparatus 1.

The rigid member 81 comprises two levers 83. The levers may be made of any suitable material. In some examples the levers may be made of aluminium as this may provide a light weight yet strong support structure 41.

The levers 83 may be pivotably connected to each other. In the example of FIGS. 12A and 12B the levers 83 are connected by a screw 85. The screw 85 allows the two levers 83 to rotate relative to each other.

Each of the levers 83 may be connected to the substrate 3 via a pin. One of the levers 83 may be connected to the first region 9 of the substrate via a first pin 87 and the other lever 83 may be connected to the second region 11 of the substrate 3 via a second pin 89.

The pins 87, 89 are provided in grooves 88, 90. The pins 87, 89 and grooves 88, 90 may be arranged to allow for rotation of the regions 9, 11 of the substrate 3 relative to the levers 83. This may allow the substrate 3 to be moved between the open and closed configurations.

When the apparatus 1 is in the open configuration the pins 87, 89 and grooves 88, 90 may prevent lateral movement of the regions 9, 11 of the substrate 3. The pins 87, 89 may be provided at the end of the grooves 88, 90 so that the regions 9, 11 of the substrate 3 cannot be pulled away from each other.

FIGS. 13A to 13D illustrate an example support structure 41 and substrate 3 being moved from an open configuration to a closed configuration. In the open configuration the angle between the first region 9 of the substrate 3 and the second region 11 of the substrate 3 is 180 degrees or substantially 180 degrees. The mesh 21 is in a compressed state and the flexible member 43 is in the flat state so that the protrusions 45 of the support member 41 are not in contact with each other. In such a configuration the user may access and view the display 5.

When the apparatus 1 is in the open configurations, as illustrated in FIGS. 12A and 12B the rigid member 81 is provided in a horizontal position. The rigid member 81 extends in a direction parallel to the length of the substrate 3. In the open configuration the levers 83 are parallel to each other so that they both extend in the same direction.

Figure 13A:
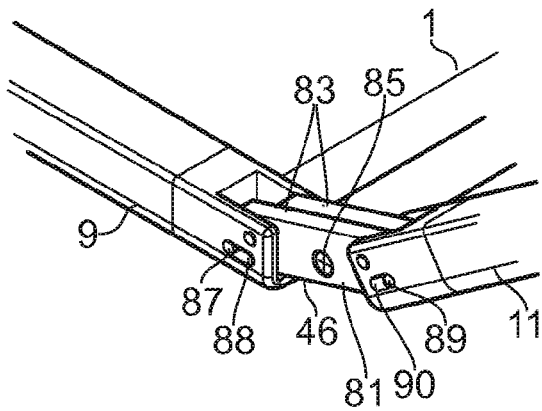

In FIG. 13A the apparatus 1 has been moved to a partially open configuration. In the partially open configuration the angle between the first region 9 of the substrate 3 and the second region 11 of the substrate 3 is an obtuse angle. In the partially open configuration the angle between the first region 9 of the substrate 3 and the second region 11 of the substrate 3 is between 90 and 180 degrees. In the particular example of FIG. 13A the angle between the first region 9 of the substrate 3 and the second region 11 of the substrate 3 is approximately 135 degrees.

In some examples the apparatus 1 may be held in the partially open positions so that the apparatus 1 will only move out of the partially open positions if a force is applied to the apparatus 1 by a user.

As the apparatus 1 has moved from the open configuration to the partially open configuration of FIG. 13A the rigid member 81 has rotated relative to the regions 9, 11 of the substrate 3. As the apparatus 1 has moved from the open configuration to the partially open configuration of FIG. 13A the two levers 83 have also rotated relative to each other about the screw 85 so that they are no longer parallel with each other. The pins 87, 89 have also moved within the grooves 88, 90 so that the pins 87, 89 are no longer at the ends of the grooves 88, 90.

Figure 13B:
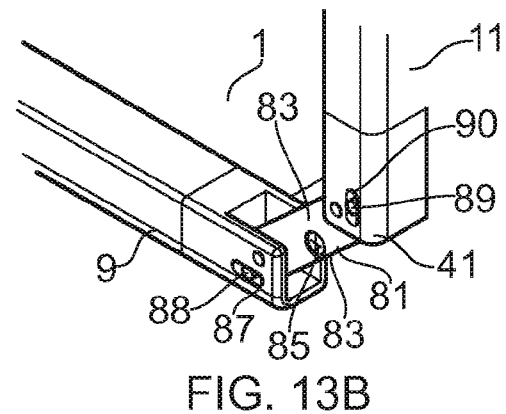

In FIG. 13B the apparatus 1 has been moved to another partially open configuration. In the partially open configuration of FIG. 13B the first region 9 of the substrate 3 and the second region 11 of the substrate 3 are perpendicular to each other. In the partially open configuration of FIG. 13B the angle between the first region 9 of the substrate 3 and the second region 11 of the substrate 3 is a right angle. In the partially open configuration of FIG. 13B the angle between the first region 9 of the substrate 3 and the second region 11 of the substrate 3 is approximately 90 degrees.

As the apparatus 1 has moved from the configuration of FIG. 13A to the configuration of FIG. 13B the rigid member 81 has rotated relative to the regions 9, 11 of the substrate 3. The two levers 83 have rotated further relative to each other. The pins 87, 89 have also moved within the grooves 88, 90 so that the pins 87, 89 are now in approximately the midpoints of the grooves 88, 90.

Figure 13C:
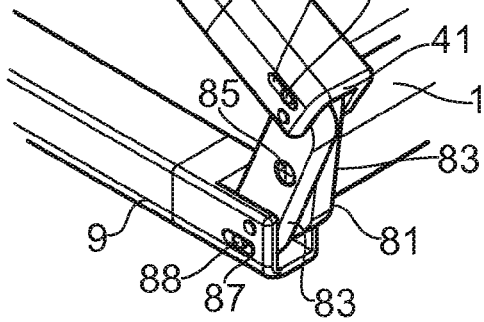

In FIG. 13C the apparatus 1 has been moved to another partially open configuration. In the partially open configuration of FIG. 13C the apparatus 1 is now closer to the closed configuration so the second region 11 of the substrate 3 is facing, at least partially, towards the first region 9 of the substrate 3.

In the partially open configuration of FIG. 13C the angle between the first region 9 of the substrate 3 and the second region 11 of the substrate 3 is an acute angle. In the partially open configuration of FIG. 13C the angle between the first region 9 of the substrate 3 and the second region 11 of the substrate 3 is between 0 and 90 degrees.

As the apparatus 1 has moved from the configuration of FIG. 13B to the configuration of FIG. 13C the two levers 83 have rotated further relative to each other and the rigid member 81 has rotated further relative to the regions 9, 11 of the substrate 3. The pins 87, 89 have also moved within the grooves 88, 90 so that the pins 87, 89 are positioned closer to the second end of the grooves 88, 90.

Figure 13D:
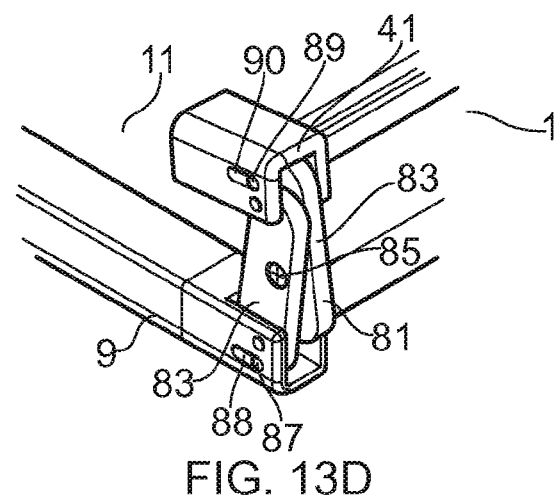

In FIG. 13D the user has continued to fold the apparatus 1 so that the apparatus 1 is in a closed configuration. In the closed configuration the first region 9 and the second region 11 of the substrate 3 may be arranged overlaying each other. In some examples, when the apparatus 1 is in the closed configuration at least a part of the first region 9 and at least a part of the second region 11 may be in contact with each other.

When the apparatus 1 is arranged in the closed configuration the rigid member 81 extends in a direction which is perpendicular or substantially perpendicular to the first region 9 of the substrate 3. The two levers 83 are arranged so that they are not parallel to each other but may form a "X" shape. The pins 87, 89 may be provided at the opposite end of the grooves 88, 90 compared to the open configuration.

FIGS. 14A and 14B illustrate an example apparatus 1 in a closed configuration. FIG. 14A illustrates a perspective view of the apparatus 1 and FIG. 14B illustrates a side view of the apparatus 1. The rigid members 81 provide a support structure 41 on either side of the bendable region 7 of the substrate 7. The support structure 41 prevents the bendable region 7 from being further compressed when the apparatus 1 is in the closed configuration.

FIGS. 15A and 15B illustrate another example of a support structure 41. In this example the support structure 41 comprises a plurality of projections 201. The projections are provided adjacent to the mesh of the bendable portion 7 of the substrate 3. A support structure 41 may be provided on either side of the mesh 21.

In the open configuration the projections 201 are spaced from each other so that there is a small gap 203 between each of the projections 201. In the particular example of FIGS. 15A and 15B when the apparatus 1 is in the open configuration there is no physical contact between the projections 201. This may allow for movement of the bendable portion 7 when the support structure 41 is in the open configuration.

In the example of FIGS. 15A and 15B the projections 201 have the same cross sectional shape. In FIGS. 15A and 15B each of the projections 201 have the same cross sectional shape. In other examples the projections 201 may have different cross sectional shapes.

In the example of FIGS. 15A and 15B the projections 201 also comprise interlocking portions. In the particular example of FIGS. 15A and 15B the interlocking portions comprise a protrusion 211 which is provided on a side of a projection 201. In the particular example of FIGS. 15A and 15B a protrusion 211 may be provided on each projection 201. The protrusions 211 may be configured to fit into corresponding recesses 213 on adjacent projections 201. The protrusions 211 and recesses 213 may be arranged so that when the support structure 41 is arranged in the closed configuration the protrusions 211 fit into the recess 213. This may hold the projections 201 in position relative to each other. This may provide a stronger support structure 41 when the apparatus 1 is arranged in the closed configuration. This may also prevent the support structure 41 from being deformed in other ways such as twisting or rotation when the apparatus 1 is in the closed configuration.

The support structure 41 may provide a rigid frame which may prevent the radius of curvature of the bendable portion 7 from exceeding a threshold when the support structure 41 is coupled to the substrate 3. The example support structure 41 of FIGS. 15A and 15B may be formed integrally with the mesh 21 of the bendable portion 7. This may reduce the number of components of the apparatus 1.

FIG. 16 illustrates a method of providing an apparatus as described above according to an example of the disclosure. The method comprises providing, at block 111, a bendable display 5. The method also comprises providing, at block 113, a substrate 3 configured to support the bendable display 5 wherein the substrate 3 comprises at least one bendable portion 7 configured to enable the bendable display 5 to be moved between an open configuration and a closed configuration. The method also comprises providing, at block 115, a support structure 41 provided adjacent to the bendable portion 7 of the substrate 3 configured to provide a rigid support for the bendable portion 7 of the substrate 3 when the display 5 is in the closed configuration. It is to be appreciated that the blocks of the method illustrated in FIG. 15 do not necessarily imply an order for the method and the method may be carried out in any suitable order.

Examples of the apparatus 1 and method described above provide for a bendable apparatus 1 which has a support structure 41. The support structure 41 is arranged to allow the apparatus 1 to be easily moved between the open and the closed configurations but prevent further deformation of the apparatus 1. This may protect components such as a display 5 and other sensitive electronic components from damage.

The example support structures 41 described above have a small number of moving parts which makes them easier to assemble and manufacture and also provides a smoother user experience. This may also reduce the amount of noise which the apparatus 1 may make as it is opened and closed.

The example support structures 41 described above are also small and can be positioned adjacent to the bendable region 7 of the substrate 3. This allows the support structure 41 to be provided without making the resulting apparatus 1 too bulky.

The term "comprise" is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this detailed description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some or all other examples. Thus "example", "for example" or "may" refer to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed. For example in the above description it is explained how the support structure provides a rigid support for the bendable portion of the substrate when the display 5 is in the closed configuration. It is to be appreciated that the support structure may also provide a support for the substrate 3 when the display 5 is not in the closed configuration. For example, the support structure may provide a support for the substrate 3 when the display 5 is in an open or partially open configuration.

Also in some examples the apparatus 1 may comprise sensors, such as optical sensors, which may be configured to detect the position and/or movement of the support structure 41. This may enable the angle between the regions 9, 11 of the substrate to be determined.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a bendable display;
   a substrate configured to support the bendable display wherein the substrate comprises at least one bendable portion configured to enable the bendable display to be moved between an open configuration and a closed configuration; and
   a support structure provided adjacent to the bendable portion of the substrate configured to provide a rigid support for the bendable portion of the substrate, at least, when the display is in the closed configuration, wherein the support structure comprises a plurality of rigid projections provided on a flexible member, and wherein the rigid projections are spaced from each other when the display is in the open configuration.

2. An apparatus as claimed in claim 1 wherein the support structure is configured to prevent the radius of curvature of the bendable portion exceeding a threshold.

3. An apparatus as claimed in claim 1 wherein the plurality of rigid projections are provided on the flexible member and arranged such that the rigid projections interlock with each other to form a rigid support when the display is in the closed configuration.

4. An apparatus as claimed in claim 3 wherein the flexible member is coupled to the substrate.

5. An apparatus as claimed in claim 4 wherein the flexible member is coupled to the substrate on either side of the bendable portion.

6. An apparatus as claimed in claim 4 wherein the flexible member is coupled to the substrate to allow for relative movement between the flexible member and the substrate.

7. An apparatus as claimed in claim 1 wherein the support structure comprises a rigid member wherein the rigid member is pivotably connected to the substrate on either side of the bendable portion.

8. An apparatus as claimed in claim 7 wherein the rigid member is configured to be moved between a horizontal position when the apparatus is in an open configuration and a vertical position when the apparatus is in a closed configuration.

9. An apparatus as claimed in claim 7 wherein the rigid member comprises two members configured to pivot relative to each other.

10. An apparatus as claimed in claim 1 wherein the support structure also provides support to the substrate when the display is not in the closed configuration.

11. An apparatus as claimed in claim 1 wherein the bendable portion of the substrate comprises a mesh structure.

12. An apparatus as claimed in claim 1 wherein the display is continuous across the bendable portion.

13. An apparatus as claimed in claim 1 wherein when the display is in the closed position a first portion of the display and a second portion of the display are configured facing each other.

14. An electronics communication device comprising an apparatus as claimed in claim 1.

15. A method comprising:
providing a bendable display;
providing a substrate configured to support the bendable display wherein the substrate comprises at least one bendable portion configured to enable the bendable display to be moved between an open configuration and a closed configuration; and
providing a support structure adjacent to the bendable portion of the substrate configured to provide a rigid support for the bendable portion of the substrate at least when the display is in the closed configuration, wherein the support structure comprises a plurality of rigid projections provided on a flexible member, and wherein the rigid projections are spaced from each other when the display is in the open configuration.

16. A method as claimed in claim 15 wherein the support structure is configured to prevent the radius of curvature of the bendable portion exceeding a threshold, wherein the plurality of rigid projections are provided on the flexible member and arranged such that the rigid projections interlock with each other to form a rigid support when the display is in the closed configuration, wherein the flexible member is coupled to the substrate, wherein the flexible member is coupled to the substrate on either side of the bendable portion, and wherein the flexible member is coupled to the substrate to allow for relative movement between the flexible member and the substrate.

17. A method as claimed claim 15 wherein the support structure comprises a rigid member wherein the rigid member is pivotably connected to the substrate on either side of the bendable portion.

18. A method as claimed in claim 17 wherein the rigid member comprises two members configured to pivot relative to each other.

19. A method as claimed in claim 15 wherein the bendable portion of the substrate comprises a mesh structure.

20. A method as claimed in claim 15 wherein the display is continuous across the bendable portion, and wherein when the display is in the closed position a first portion of the display and a second portion of the display are configured facing each other.

* * * * *